H. A. STEPHENS.
WATER METER.
APPLICATION FILED MAR. 7, 1914.

1,164,425.

Patented Dec. 14, 1915.

Witnesses:
C. M. Ott
F. M. Reid

Inventor
Harold A. Stephens
By his Attorneys
Criswell & Criswell

H. A. STEPHENS.
WATER METER.
APPLICATION FILED MAR. 7, 1914.

1,164,425.

Patented Dec. 14, 1915.
4 SHEETS—SHEET 4.

UNITED STATES PATENT OFFICE.

HAROLD A. STEPHENS, OF NEW YORK, N. Y.

WATER-METER.

1,164,425.

Specification of Letters Patent.

Patented Dec. 14, 1915.

Application filed March 7, 1914. Serial No. 823,157.

*To all whom it may concern:*

Be it known that I, HAROLD A. STEPHENS, a citizen of the United States, and a resident of New York, borough of Brooklyn, county of Kings, and State of New York, have invented certain new and useful Improvements in Water-Meters, of which the following is a full, clear, and exact description.

This invention relates more particularly to a water meter or system in which a normal flow or head of water may take place and in which a maximum flow or head of larger volume is controlled and is adapted to be accurately measured by the meter.

In the meter or a system of which the meter forms a part, it is usual to provide a casing through which the water is adapted to pass in a maximum volume or head in emergency cases, as for fire purposes, and in which a normal flow or head of water is maintained for ordinary purposes. The water of the normal flow is controlled by valves and is measured by a separate meter and the larger volume is only called into use for unusual purposes, and which larger volume should also be measured accurately and without offering an unusual resistance to the head of water, as such resistance, if beyond a certain per cent., is fatal to the practical use of the meter and the requirements of the fire underwriters. In meters as ordinarily constructed, there are very many defects both in the method of measuring, in the leakage, and in the construction and character of the device employed which often is of a complicated nature and offers such an obstruction as will collect foreign matter which injuriously affects the proper working of the invention.

One of the principal objects of the present invention is to provide a meter which may be employed in connection with a system as herein mentioned but which is so constructed and the pressure differential so maintained that the normal flow may be taken care of and the maximum flow or volume controlled in such a way that it can be brought into action immediately when required with comparatively little resistance to the head of the larger volume of water.

Another object of the invention is to provide a meter which is readily attached to or detachable from a part of a meter system and which is so constructed that the interior thereof is readily accessible for repairs or for assembling the various parts of the meter.

Other objects of the invention are to provide a simple and efficient flapper, check, or main valve which is so constructed that it will readily seat itself properly and at the proper time; to provide simple and efficient means whereby the valve may be retained against its seat by simple and efficient means forming a differential pressure in such a way that the valve may be unseated when the pressure differential is destroyed; to provide simple means whereby a resistance may be offered sufficient to divert a part of the maximum or larger volume or head of water in such a way as to operate a proportional meter for measuring purposes; to provide a simple and efficient auxiliary valve which coöperates with the main or flapper valve to assist in the proper operation of the same and to serve further as a resistance medium for a diversion of a part of the flow of water to the measuring means; to provide means whereby the extent of opening of the main valve may be readily determined; and to provide means whereby when the main valve is open it will offer very little obstruction or resistance to the flow of water of the larger volume but which will always return to its seat at the proper time.

A further object of the invention is to provide means whereby there is substantially no waste of water in the operation of the meter, and to provide means whereby there is little chance for the collection of dirt or foreign matter to obstruct the proper working of the parts within the meter.

With these and other objects in view, the invention will be hereinafter more particularly described with reference to the accompanying drawings, which form a part of this specification, and will then be pointed out in the claims at the end of the description.

In the drawings, Fig. 5 is a vertical fragmentary section taken on the line V—V of Fig. 1. Fig. 12 is a fragmentary section showing how the outlet openings from the proportional meter may be protected.

The casing 10 has a substantially oval-shaped body with feet 11 for securing the same to a base or support and at opposite ends has flanges 12 by which the same may be detachably held as a part of the water meter system. A main conduit 13 is provided which has a by-pass 14 of considerably less area than the conduit and through which by-pass the normal flow of water is adapted to pass and to be measured by a suitable independent meter, there being also suitable valves automatically or otherwise adapted under certain conditions to shut off the normal supply. The casing 10 has an outlet opening 15 which is in substantial alinement with the main conduit 13 and communicates with the interior of the casing and also with the normal supply of water passing through the by-pass 14. There may be a by-pass 14 in both sides of the conduit 13 to adapt the casing for either a right or a left hand system. Ordinarily only one by-pass is used at a time, the other by-pass being closed by a cover or flange, it being understood that either or both by-passes may be arranged in any desired manner.

The main conduit 13 at its inner end has a casing member 16 securely held thereto so as to have a tight joint therewith. This casing member 16 has a passage therethrough forming a continuation of the conduit 13 and is in effect a part thereof, and therefore when the conduit is referred to, it is intended to include not only that part integral with the casing 10 but also the continuation which is in the casting or casing member 16. The outer end or face of the casing member 16 is angularly arranged with respect to a vertical transverse section and adapted to control the water through the conduit is a flapper or other valve 17. This valve 17 is subject to pressure differential so that it will remain seated under the ordinary head of water and under the normal supply, but when an unusual or extraordinary supply is required, as for fire purposes, the pressure differential will be destroyed and the valve will open to permit substantially the maximum current of water to flow through the conduit or passage 13 out through the opening 15, and when the maximum or larger supply is not further required, the valve 17 will again automatically seat itself and the normal supply through the by-pass 14 immediately flows. The valve 17 has a body portion 18 which is adapted to extend inward within the conduit 13 and has a flange 19 under which is arranged an annular valve member 20 which is adapted normally to rest against a valve seat 21 arranged within a depressed portion in the casing member 16. A valve ring 22 is arranged around the body 18 under the valve member 20 and is held in position by a washer or ring 23. The ring 22 may be loose around the valve and will serve to form substantially a seal with the valve seat 21, both before the valve reaches its seat 21 in closing and for a period of time after the opening of the valve after the valve member 20 is removed from its seat 21. The valve 17 is provided with a yoke 24 and is pivotally held at 25 to an arm 26. This arm 26 has an enlarged boss 27 which is pivoted by a bolt or rod 28 to lugs forming a part of the casing member 16. The position of the valve 17 with respect to the arm 26 is maintained by two or more bolts 29 which are adjustable in the valve and have their heads abutting against a portion of the arm 26, the said bolts being held in their adjusted position by means of lock nuts 30.

A cam 31 may form a part of the yoke 24 and is provided with bosses 32 through which extend bolts 33. These bolts are adapted to be adjustably locked in said lugs in different positions, and the inner ends of said bolts are adapted to engage the outer part of the flange 19 of the valve 17, thus serving to adjust the yoke and valve with respect to each other. The cam 31 has an extended portion or dwell 34 the upper edge of which is depressed, as at 35, and said depressed portion is adapted to be engaged by a roll 36 carried by a pivotally held arm 37 when the said valve is in the closed position, but on the opening of the valve the dwell of the cam portion 34 will pass upwardly forming a track for the roll 36 until the valve is in its full open position. At this time the valve is maintained in such a way that a constant and not excessive resistance is offered to the flow of water passing through the conduit 13. The valve in its open position is maintained in such a way that it will automatically close, but it is desirable that no excessive back pressure be exerted thereby on the water passing through the conduit 13. The arm 37 is substantially L-shaped and is pivotally held at 38 between lugs or bosses 39 of a bracket 40, the said bracket being secured to the inner part of the casing by means of bolts 41 or otherwise. A weight 42 is adjustably secured to the arm 37. This adjustability of the weight 42 is secured by means of a slot 43 in the weight through which pass bolts 44 or other devices so that the relative position of the weight 42 and the pressure exerted by it upon the cam 31 may be changed at will to assist with the pressure of water on the side of the valve opposite the conduit in holding the valve to its seat and maintaining the differential pressure by which the valve remains seated.

It will be apparent that under ordinary conditions the normal supply will be permitted to pass through the by-pass 14 and be metered in the usual way, but when there is an unusual demand for the water and the differential pressure on opposite sides of the valve is destroyed, the valve 17 will immediately become unseated so that the maximum flow of water will pass through the conduit 13, at which time the water passing through the by-pass 14 may be automatically cut off or not as desired. It will be apparent also that the valve 17 need not move over sixty degrees to be fully open.

It is desirable that as little resistance be offered to the large flow of water through the conduit 13 as possible and it is desirable also that the larger flow of water be measured without offering excessive resistance thereto so as to reduce the pressure of the water as otherwise it will not meet the requirements of the rule laid down by the underwriters for a purpose of this kind. For this purpose, various means may be employed. As shown, I provide a plurality of openings 45 of sufficient size and number which will convey a small part of the water into a by-pass 46 in the casing member 16. Above this by-pass is a meter casing 47 which is adapted to be held within an opening 48 of the casing 10 and within which is a proportional registering meter or device 49. A cover 49$^a$ having a shallow bowl-like upper portion is placed over the opening 48 and has a depressed substantially cup-shaped part 49$^b$ for the registering mechanism over which is a cover member 49$^c$ which is adapted to be locked to the cover 49$^a$.

Figure 1:
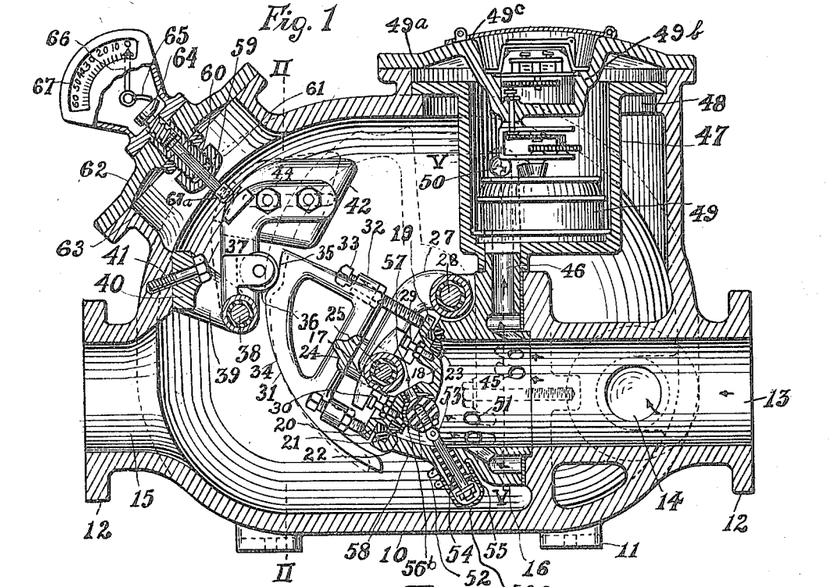
Figure 1 is a vertical section, partly in elevation, of one form of meter or device embodying my invention.
Figure 2:
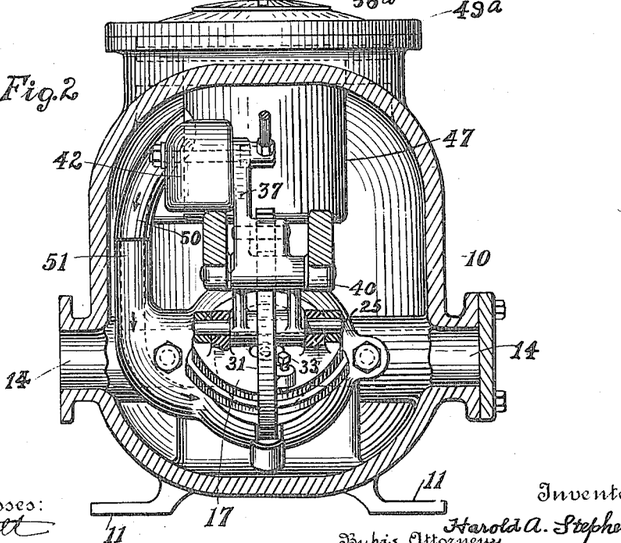
Fig. 2 is a vertical section taken on the line II—II of Fig. 1.

The water in passing through the meter 49 enters a by-pass or opening 50 which forms a part of a connection 51, Figs. 1 and 2, leading downward to the bottom of the casing member 16 and from which the water passes through a suitable number of openings 51 so as to combine with the main body of water. The reverse direction of the water may be obtained for measuring purposes and the relative sizes of the openings and number changed to adapt the water to pass properly to and from the measuring means. The resistance to the water while passing through the conduit 13 may be obtained in any suitable way. As one means, an auxiliary valve 52 is provided which is held to the end 53 of an automatically adjustable bolt or stem 54. The end 53 of the bolt may be pivotally supported to have a slight movement on the end of the bolt 54 and the said bolt may pass through a packing 55 in an extension or part of the casing member 16, and on the outer end of the bolt 54 may be arranged a nut 56 by which the bolt 54 may have a limited movement, a sealing cap 56$^a$ being provided to prevent tampering with the adjustment of the valve 52. The valve 52 is spherical in form and is adapted to be seated against a substantially cup-shaped valve seat 56$^b$ through which is an opening 57. This valve forms a certain amount of suction with its seat so as to assist in maintaining the differential pressure and the opening controlled by the valve also serves to assist in permitting the valve 17 to close. The valve 52 offers a sufficient obstruction to the water but not such as to materially affect the pressure thereof, but the resistance is of sufficient intensity to permit a part of the water to flow to the proportional meter 49, the said resistance being assisted to a certain extent by the upwardly flared end 58, the latter also serving to direct the water to the opening 15. The meter 49 is of the usual construction and will measure a certain part of the larger flow and by the proportion measured, the entire amount of water passing through the conduit may be readily determined.

It will be evident from the construction shown that the said valve will open and be maintained in this open position so that it will be entirely automatic in its action and still offer very little yet uniform resistance to the flow of water; that the differential pressure is properly maintained so that the main valve will open immediately when the differential pressure is destroyed; that effective means is provided whereby the proper resistance is offered in order that a proportional measuring means may be employed without injuriously affecting the pressure of the water; that the construction is simple and the parts are readily accessible for repairs and for other purposes; that the construction is such that the parts will not be likely to clog and that foreign matter is not likely to collect in such a way as to affect the operativeness of the invention; that the said invention is applicable to various meter systems; and that the construction is such that there is no waste whatever.

In order to determine whether or not the valve 17 is operating properly and to determine the pressure exerted by the water on the valve, I provide a rod or stem 59 adapted to be actuated as the valve 17 opens or closes. This stem passes through a stuffing box 60 on which is a cap 61, and said stuffing box and cap are mounted upon a lid or head 62 over an angularly arranged opening 63. This opening 63 is of sufficient size and is so arranged that ready access may be had to the interior of the casing 10 and to the valve 17 and the parts coöperating therewith for repairs or for other purposes. This stem 59 is adapted to operate a part 64 which engages the arm 65 of a pointer 66, the latter being adapted to move in the arc of a circle along an indicator 67 so as to determine the extent of opening of the valve as well as the pressure of the water passing through the conduit 13, though other indicating means may be employed. The rod 59 has an adjustable end or cap 67$^a$ which is engaged by a part of the arm 37 and serves to permit the indicator to be brought to its true position.

In Figs. 7 to 10, a construction somewhat different and a different arrangement of the auxiliary means coöperating with the main valve are shown. The casing in this construction is substantially the same as that already described except that the casing member 68 has to be changed from that shown at 16, Figs. 1 to 5, to adapt it for the new construction. The valve 69 is pivotally held to the arm 70 in substantially the same manner as the valve 17 and is adjustable with respect to the arm to adapt it to readily seat itself in the casing member 68, and said valve 69 is provided with a cam and is adapted to be acted on by a weighted arm in substantially the same manner as that shown in the other figures. The valve 69 is provided with extensions 71 and each extension is provided with an enlarged head circular in form. These heads are recessed, as at 73, and in said recessed portions are rings or disks 74 which are adapted to be engaged by and to form a seal with the upper ends of substantially cup-shaped devices or members 75. Each device 75 is held to the side of the casing member 68 by screws 76 or otherwise, and adapted to move lengthwise in each of said cup-shaped members is a rod 77. This rod 77 extends through a packing or bushing 78 and has a nut 79 on one end thereof affording a limited movement to the rod 77, and pivotally held as a part of said rod is a part 80 on which is a valve 81. The valve 81 is spherical in form and is adapted to seat itself in a cup-shaped bushing 82 secured in the valve 69. This cup-shaped bushing 82 has a passage 83 therethrough for the passage of the water in the same manner as described in connection with the construction shown in Figs. 1 to 5. Each passage 83 communicates with a chamber 84 in the cup-shaped member 75 and said chamber 84 communicates by a passage with the main conduit 13, the water in the conduit 13 being controlled by the valve as already described, the function of the valve 81 being substantially the same as that already described except that it does not offer the resistance to the main body of water and is not arranged in the path of the larger flow of water controlled in its passage through the conduit. The resistance for the purpose of directing a part of the water to the proportional meter may be secured by the deflection of the inner end of the conduit 13 and by means of one or more devices 86. The device 86 forms a sort of receptacle or scoop-like device which serves to collect a part of the water in its passage through the conduit 13 and to direct the same into the by-pass 46 leading to the proportional meter as already explained. The device may be secured by screws or otherwise within the main conduit 13 and may be variously arranged to meet different requirements.

Figures 3, 4, 11:
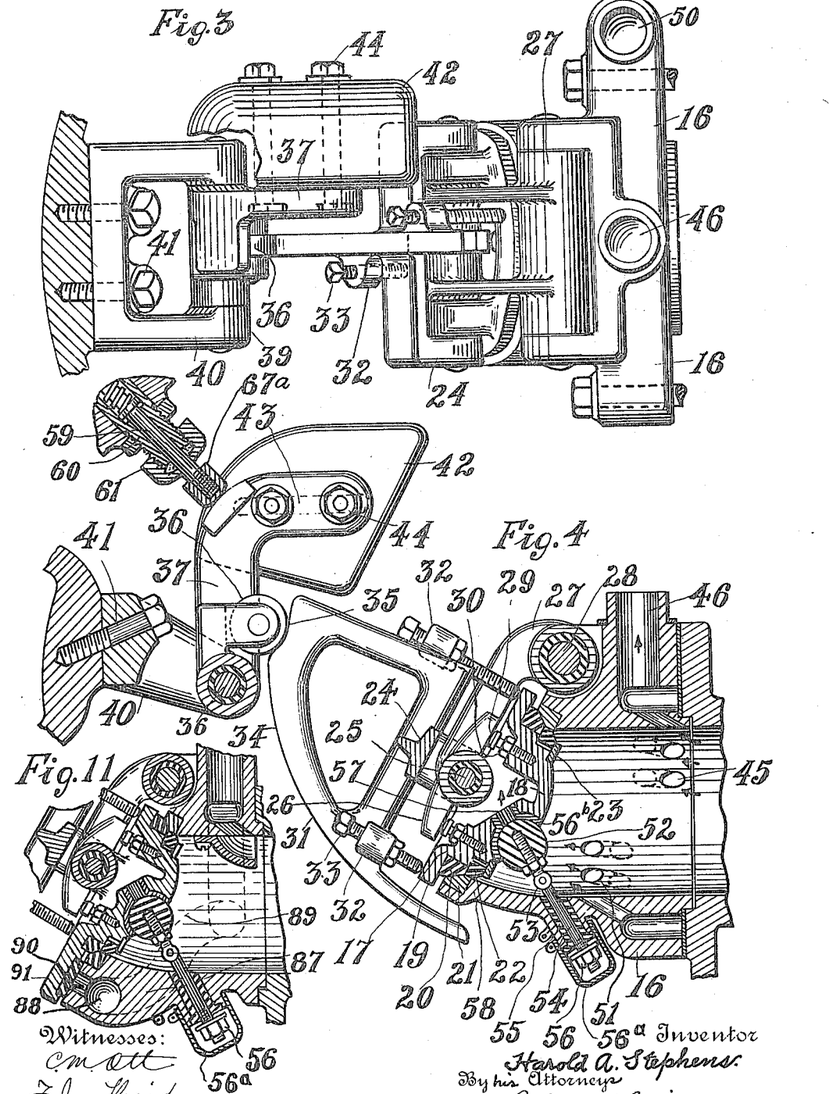
Fig. 3 is an enlarged sectional plan showing the interior valve and part of the mechanism within the casing.
Fig. 4 is a fragmentary section, partly broken away and partly in elevation, of the parts of the invention shown in Fig. 3.
Fig. 11 is a fragmentary vertical section showing a different arrangement of the eduction side of the by-pass of the proportional meter.
Figures 6, 7, 8, 9, 10:
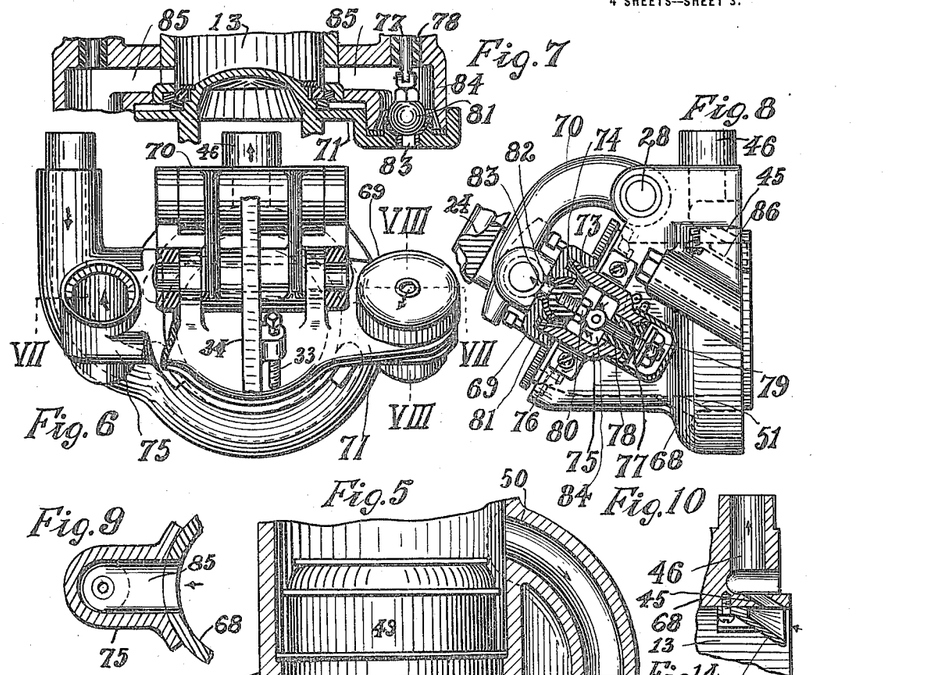
Fig. 6 is a fragmentary plan view, partly broken away, of a different arrangement and construction of main and auxiliary valves.
Fig. 7 is a fragmentary section taken on the line VII—VII of Fig. 6.
Fig. 8 is a fragmentary vertical section, partly broken away and partly in elevation, taken on the line VIII—VIII of Fig. 6.
Fig. 9 is a fragmentary sectional plan of a part of the means for holding one of the auxiliary valves of the construction shown in Figs. 6 to 8.
Fig. 10 is an enlarged fragmentary section of means for offering resistance to the main flow of water for diverting a part thereof for measuring purposes.

In Fig. 11, the by-pass to the proportional meter may be the same as shown in Fig. 1 with one or more openings as shown in Figs. 7 to 10, and on the eduction side instead of the water passing through openings at the lower part of the conduit 13 and within the conduit 13 adjacent to the auxiliary valve, the casing member 16 may be extended, as at 87, and provided with a chamber 88 which communicates by a passage 89 with the outlet or return opening 50 located above the meter 49. The chamber 88 in the casing member 87 has an outlet 90 which is controlled by a flange portion 91 on the main valve. It will be evident from the construction shown that the water to be measured by the proportional meter is supplied entirely from within the conduit 13 and that the eduction or waste from the meter is permitted to pass into the larger flow of water after leaving the conduit 13 and the main valve has been opened by the change in the differential pressure which normally keeps the said valve seated. It will be seen too that by controlling the passage 90 through the main valve, there is no waste whatever; and there is no registration by the proportional meter unless the main valve is unseated and the passage opened thereby. It will be seen also that this construction serves as a counter check to the indicator because if the valve is not seated the proportional meter will register.

Fig. 12 differs from Fig. 10 and Figs. 1 to 4 in that the inlet opening or openings of the by-pass 46 leading to the proportional registering means is provided with a device 92 and a similar device or devices 93 are arranged to direct and partly cover the exit openings of the measured water and further serves to offer a resistance sufficient to cause a part of the water to pass into the opening or openings adjacent to the device 92, though it will be understood that the relative arrangement of the openings leading to and from the proportional meter may be variously changed and that part of the water measured may be conveyed to any suitable point as desired.

Figure 13:
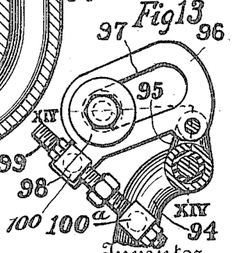
Fig. 13 is a fragmentary view showing an auxiliary weight for the main valve.
Figure 14:
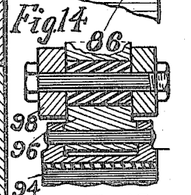
Fig. 14 is a fragmentary section taken on the line XIV—XIV of Fig. 13.

In Figs. 13 and 14 is shown an auxiliary weight for assisting in keeping the main valve closed, the said weight being used in addition to or independently of the other weight. The arm 94 for the main valve carries a pair of short arms 95 between which is pivoted an adjustable track or member 96. This track is slotted at 97 along which slot a weight 98 is adapted to travel. This weight may be variously constructed and is held in such a way that it will move along the slot 97. At the outer end of the track member is held a bolt 99, which is adjustably held in a swivel 100 on said track member at one end and in a swivel 100ª on the valve arm 94 at its other end, the said bolt being held in its adjusted positions by suitable lock nuts. It will be evident that when the main valve opens the weight 98 and track will be lifted and when the valve opens far enough the weight will move along the track toward the pivot of the arm 94 and when the valve closes the said weight will move outward to exert more pressure on the main valve. The bolt 99 permits a nice adjustment to secure proper action of the weight.

Figure 15:
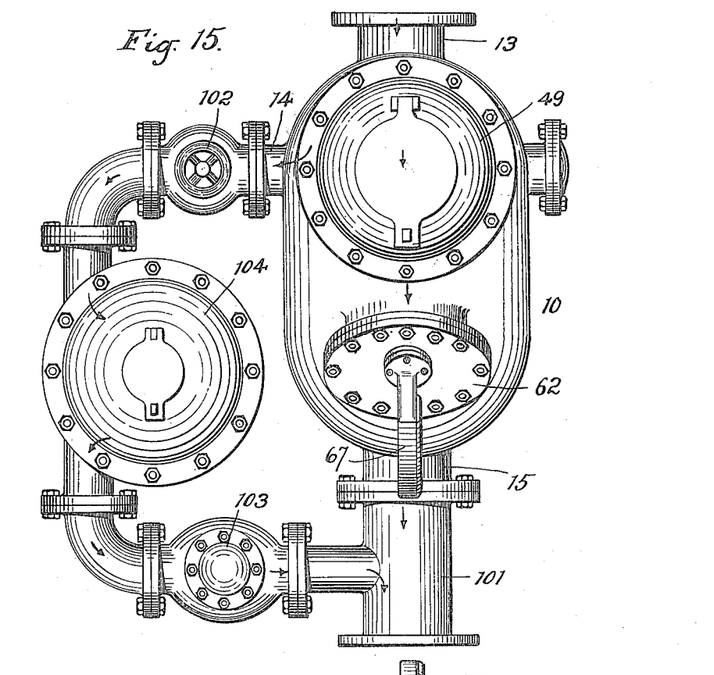
Fig. 15 is a plan view of the system of which the present invention forms a part showing the continuation of the by-pass 14.
Figure 16:
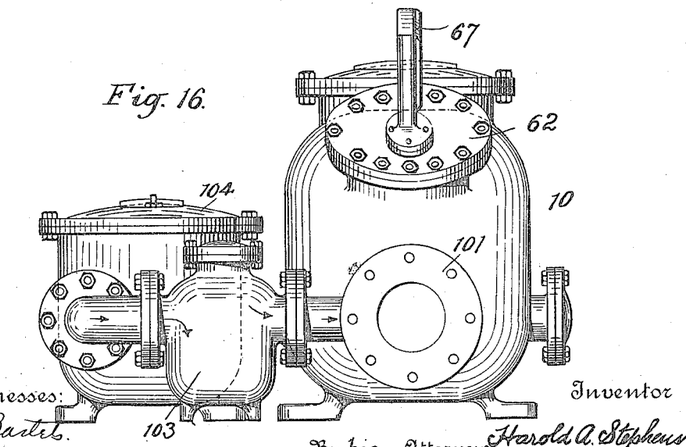
Fig. 16 is an end view of Fig. 15.

In Figs. 15 and 16 the casing 10 with the mechanism mounted therein forms a part of a system. The inlet 13 may be connected to the source of water supply and the outlet 15 of the casing 10 may be connected to a substantially T-shaped fitting 101. The by-pass 14 in the form of a substantially U-shaped pipe connects one end of the casing 10 with the fitting 101. In the by-pass is arranged a suitable gate valve 102 at the inlet portion of the by-pass, and a check valve 103 at the outlet portion of the by-pass where it connects with the fitting 101 of the larger supply of water. A meter 104 is interposed between the valves 102 and 103 and is adapted to measure the normal flow of water as it passes through the by-pass 14. The gate valve 102 may be operated when it is desired to shut off the water entirely while the check valve 103 is automatic in its action and will automatically close should there be no flow of water through the by-pass 14. The check valve 103 also serves to prevent back flow of the water of the larger volume and serves further to offer resistance to the flow of water if unusually low in order that it may cause the water to back up sufficiently to cause the same to be registered by the meter. Unless provision of this kind is made, some of the water will pass through the apparatus without being registered.

From the foregoing it will be evident that an effective water meter is provided whereby a normal flow of the water and a maximum flow may be obtained as desired; that simple means is provided whereby the differential pressure may be maintained on the main valve in such a way that the said differential pressure may be readily destroyed; that simple means is provided whereby the proper resistance may be offered to the main flow without injuriously affecting the same and in such a way that the water may be properly measured immediately as it is used; that simple and efficient means is provided for adjusting the valve and for sustaining the same either in the open or the closed position; that simple means is provided for indicating the extent of opening of the main controlling valve; that a simple and efficient construction is provided wherein the mechanism within the device is readily accessible for repairs or for assembling purposes; that the parts are so constructed that foreign matter is not likely to collect to obstruct or affect the proper working of the parts; that no waste occurs; and that the construction is such that the mechanism cannot be easily tampered with and water stolen without being indicated.

Having thus described my invention, I claim as new and desire to secure by Letters Patent:—

1. In a device of the character described, the combination of a casing having means through which a normal and a maximum flow of water take place, a valve for controlling the maximum flow of water, means whereby a differential pressure may be maintained on the valve, a meter, means leading to and from the meter to convey a part of the water of the maximum flow and only when the maximum flow is being used, and means supported in the path of the maximum flow for creating a resistance to cause a part of the water of the maximum flow to pass to the meter.

2. In a device of the character described, the combination with a casing having means through which a normal and a larger flow of water take place, a valve for controlling the larger flow of water, means whereby a differential pressure may be maintained on the valve, a meter, means leading to and from the meter to convey a part of the water of the maximum flow and only when the maximum flow is being used, said water from the meter being directed from and made to join the larger flow of water on the same side of the valve, and means providing a curved surface for creating a resistance to cause a part of the water of the larger flow to pass to the meter.

3. The combination of a casing having a conduit and a by-pass leading from said conduit, a main valve for controlling the water in the conduit, an auxiliary valve coöperating with the main valve to permit water to pass through the main valve when said auxiliary valve is unseated, a meter, and means leading to and from the meter to convey a part of the water from and to the conduit, said conduit having its outer end flared and having an angularly arranged seat for the valve.

4. In a device of the character described, the combination of a casing having a conduit and a by-pass, a main valve controlling the main conduit, a resistance auxiliary valve adapted to seat itself in said controlling valve, and means for measuring the flow of water through the conduit when the main valve is open.

5. In a device of the character described, the combination of a casing having a conduit and by-pass, a main valve controlling the main conduit, an auxiliary spherical resistance valve adapted to seat itself in said controlling valve, and means for measuring the water passing through the conduit when the main valve is open.

6. In a device of the character described, the combination of a casing having a conduit and a by-pass leading from the conduit of less diameter than said conduit, a meter, means for directing a part of the water in the conduit to and from the meter and causing the said part of the water to join the main body of water, and means for controlling the flow of water through the conduit without waste.

7. In a device of the character described, the combination of a casing having a conduit and a by-pass leading from the conduit of less diameter than said conduit, a meter, means for directing a part of the water in the conduit to and from the meter and causing the said part of the water to join the main body of water, and two coöperating valves located at one end of the conduit and forming controlling means for the flow of the water without waste.

8. In a device of the character described, the combination of a casing having a conduit and a by-pass leading from the conduit of less diameter than said conduit, a meter, means for directing a part of the water in the conduit to and from the meter and causing the said part of the water to join the main body of water, a main valve controlling the flow of water through the conduit without waste, and an auxiliary valve coöperating with the main valve to assist in its differential action.

9. In a device of the character described, the combination of a casing having a conduit and a by-pass leading from said conduit, a valve controlling the flow of water from the conduit, means coöperating with the valve forming a differential pressure to cause the valve to remain normally seated, a meter communicating with said conduit at the upper portion thereof, said casing having a by-pass leading from the meter and communicating with the lower portion of the conduit, and an auxiliary valve coöperating with the main valve and serving to offer resistance to the flow of the water through the conduit when the valve is open.

10. In a device of the character described, the combination of a casing having a conduit and a by-pass of less diameter leading from said conduit for a normal flow of water, a valve controlling the flow of water through the conduit, means coöperating with the valve forming a differential pressure to cause the valve to remain normally seated, a meter communicating with said conduit at the upper portion thereof, said casing having a by-pass leading from the meter and communicating with the lower portion of the conduit, and a spherical auxiliary valve coöperating with the main valve and serving to offer resistance to the flow of the water through the conduit when the valve is open.

11. In a device of the character described, the combination of a casing having a conduit, a valve controlling the flow of water through the conduit, means acting on the valve and assisting in forming a differential pressure to cause the valve to remain normally seated, a meter communicating with said conduit, said casing having an eduction by-pass leading from the meter and communicating with the lower portion of the conduit, and an auxiliary valve coöperating with the main valve within the conduit and serving to offer resistance to the flow of the water through the conduit when the valve is open.

12. The combination of a casing having a conduit at one end and an opening in substantial alinement with the conduit, means whereby a resistance may be offered to the flow of water through the conduit, a meter, means whereby a part of the water may be caused to pass to and from the meter and to join the body of water in the conduit, a valve controlling the flow of water through the conduit, and means supported within the casing and acting on opposite sides of the valve independently of the water to assist in holding said valve to the seat.

13. The combination of a casing having a conduit extending a part of its length and having an opening in substantial alinement with the inner end of the conduit, a meter, means whereby a part of the water may be caused to pass to and from the meter and to join the body of water in the conduit, a main valve controlling the flow of water through the conduit, and an auxiliary resistance valve supported within the casing and adapted to engage the main valve and assist in holding the latter valve against its seat.

14. The combination of a casing having a conduit and a by-pass for the flow of a smaller body of water therethrough, means for measuring a part of the flow of water through the conduit, a valve, means exerting a pressure against the valve and against the flow of water through the conduit, and an auxiliary resistance valve having a seat in the main valve on the side opposite the pressure means.

15. The combination of a casing having a conduit, means for measuring a part of the flow of water through the conduit, a pivotally held valve, means for adjustably and pivotally supporting said valve, a cam, means for adjusting the cam with relation to the valve, a pivotally held arm carrying a roller adapted to engage a part of the cam, and an adjustable weight mounted on said arm.

16. The combination of a casing having a conduit, means for measuring a part of the flow of water through the conduit, a valve controlling the flow of water through said conduit, means for supporting said valve, a cam, a pivotally held arm, and an adjustable weight mounted on said arm.

17. The combination of a casing having a conduit, means for measuring a part of the flow of water through the conduit, a pivotally held valve controlling the flow of water through said conduit, means for adjustably and pivotally supporting said valve, a cam, means for adjusting the cam with relation to the valve, and means acting on said cam tending to force said valve to its seat.

18. The combination of a casing having a conduit, a valve controlling the outlet of said conduit, means for measuring a part of the water passing through said conduit, a cam, an arm pivotally held to the casing acting on said cam, and a weight adjustably held to said arm.

19. The combination of a casing having a conduit, a valve controlling the outlet of said conduit, means for measuring a part of the water passing through said conduit, a cam movable with the valve, and a weight acting on said cam.

20. The combination of a casing having a conduit, a valve controlling the outlet of said conduit, means for measuring a part of the water passing through said conduit, a cam movable with the valve, an arm pivotally held to the casing, a roller carried by the arm adapted to engage the cam, and a weight held to said arm and tending normally to hold the valve in its seat.

21. The combination of a casing having a conduit, measuring means for measuring a part of the water passing through said conduit, a valve controlling the flow of water through said conduit, means tending normally to force the valve to its seat, a rod, an indicator, and indicating means operated by said rod in the opening movement of the valve to ascertain if said valve is operating properly.

22. The combination of a casing having a conduit, measuring means for measuring a part of the water passing through said conduit, a valve controlling the flow of water through said conduit, means tending normally to force the valve to its seat, and registering means operated during the opening and closing movement of the valve to ascertain if said valve is operating properly.

23. The combination of a casing having a conduit, measuring means for measuring a part of the water passing through said conduit, a valve controlling the flow of water through said conduit, means tending normally to force the valve to its seat, an indicator to ascertain if said valve is operating properly, and operative connections between the valve and indicator.

24. The combination of a casing having a conduit, measuring means for measuring a part of the water passing through said conduit, a controlling valve for the conduit, means tending normally to force the valve to its seat, indicating means to ascertain if said valve is operating properly, and means whereby the indicating means may be placed in operation during the opening movement of the valve.

25. In a device of the character described, the combination of a casing having a conduit, a valve controlling said conduit without waste, a registering mechanism, a device which controls said mechanism, and inlet and outlet chambers leading to and from the registering mechanism.

26. In a device of the character described, the combination of a casing having a conduit and a valve seat casing member, a valve controlling said conduit without waste, a registering mechanism, a device which controls said mechanism and a support for said mechanism connected directly to said casing member, said casing member having a bypass leading to and from said registering mechanism and conducting a part of the water to cause the same to be registered.

27. In a device of the character described, the combination of a casing having a conduit, a valve controlling said conduit without waste, a registering mechanism, a device which controls said mechanism, a cover having a part for the reception of said mechanism, and a cover member located over said mechanism and locked to said cover.

This specification signed and witnessed this 5th day of March, A. D. 1914.

HAROLD A. STEPHENS.

Witnesses:
LESTER C. TAYLOR,
CLARA M. OTT.

Copies of this patent may be obtained for five cents each, by addressing the "Commissioner of Patents, Washington, D. C."